US006687602B2

(12) United States Patent
Ament

(10) Patent No.: US 6,687,602 B2
(45) Date of Patent: Feb. 3, 2004

(54) METHOD AND APPARATUS FOR ADAPTABLE CONTROL OF A VARIABLE DISPLACEMENT ENGINE

(75) Inventor: Frank Ament, Troy, MI (US)

(73) Assignee: General Motors Corporation, Detroit, MI (US)

( * ) Notice: Subject to any disclaimer, the term of this patent is extended or adjusted under 35 U.S.C. 154(b) by 307 days.

(21) Appl. No.: 09/847,133

(22) Filed: May 3, 2001

(65) Prior Publication Data

US 2002/0165658 A1 Nov. 7, 2002

(51) Int. Cl.[7] .............................................. G06F 19/00

(52) U.S. Cl. .................... 701/110; 123/198 F; 701/114; 701/107

(58) Field of Search ................................ 701/110, 114, 701/107, 102, 111; 123/198 F, 399, 361; 73/116, 118.1

(56) References Cited

U.S. PATENT DOCUMENTS

| | | | | | |
|---|---|---|---|---|---|
| 5,213,078 | A | * | 5/1993 | Kolberg et al. | 123/399 |
| 5,568,795 | A | * | 10/1996 | Robichaux et al. | 123/198 F |
| 5,970,943 | A | * | 10/1999 | Robichaux et al. | 123/198 F |
| 6,277,051 | B1 | * | 8/2001 | Yeo | 477/149 |
| 6,311,670 | B1 | * | 11/2001 | Constancis | 123/352 |
| 2002/0157640 | A1 | * | 10/2002 | Matthews et al. | 123/399 |
| 2002/0162540 | A1 | * | 11/2002 | Matthews et al. | 123/399 |

* cited by examiner

*Primary Examiner*—Hieu T. Vo
(74) *Attorney, Agent, or Firm*—Christopher DeVries

(57) ABSTRACT

A control system for controlling the displacement of a variable displacement internal combustion engine including measuring a variable indicative of torque for the variable displacement internal combustion engine, generating a torque threshold that indicates a torque condition to vary the displacement of the variable displacement internal combustion engine, and characterizing driver behavior to determine the torque threshold.

15 Claims, 4 Drawing Sheets

METHOD AND APPARATUS FOR ADAPTABLE CONTROL OF A VARIABLE DISPLACEMENT ENGINE

TECHNICAL FIELD

The present invention relates to the control of internal combustion engines. More specifically, the present invention relates to a method and apparatus to control a variable displacement internal combustion engine.

BACKGROUND OF THE INVENTION

Regulatory conditions in the automotive market have led to an increasing demand to improve fuel economy and reduce emissions in current vehicles. These regulatory conditions must be balanced with the demands of a consumer for high performance and quick response from a vehicle. Variable displacement internal combustion engines (ICEs) provide for improved fuel economy and torque on demand by operating on the principal of cylinder deactivation. During operating conditions that require high output torque, every cylinder of a variable displacement ICE is supplied with fuel and air (also spark, in the case of a gasoline ICE) to provide torque for the ICE. During operating conditions at low speed, low load and/or other inefficient conditions for a fully-displaced ICE, cylinders may be deactivated to improve fuel economy for the variable displacement ICE and vehicle. For example, in the operation of a vehicle equipped with an eight-cylinder variable displacement ICE, fuel economy will be improved if the ICE is operated with only four cylinders during low torque operating conditions by reducing throttling losses. Throttling losses, also known as pumping losses, are the extra work that an ICE must perform when the air filling the cylinder must be restricted during partial loads. The ICE must therefore pump air from the relatively low pressure of an intake manifold through the cylinders and out to the atmosphere. The cylinders that are deactivated will not allow air flow through their intake and exhaust valves, reducing pumping losses by allowing the active cylinders to operate at a higher intake manifold pressure. Since the deactivated cylinders do not allow air to flow, additional losses are avoided because the trapped charge in the deactivated cylinders act as "air springs" during the compression and decompression of the air in each deactivated cylinder.

In past variable displacement ICEs, the switching or cycling between the partial displacement mode and the fun displacement mode was problematic. Frequent cycling between the two operating modes negates fuel economy benefits and affects the driveability of a vehicle having a variable displacement ICE. The operator's driving habits will affect the number of times a variable displacement ICE will cycle between the partial and the full displacement mode, and the fuel economy benefits of a variable displacement ICE. Frequent cycling will also impact component life in a variable displacement ICE.

SUMMARY OF THE INVENTION

The present invention is a method and apparatus for the control of cylinder deactivation in a variable displacement engine. In the preferred embodiment of the present invention, an eight-cylinder internal combustion engine (ICE) may be operated as a four-cylinder engine by deactivating four cylinders. The cylinder deactivation occurs as a function of the load or torque required by the vehicle and driver behavior. According to the present invention, different driver behaviors will create different criteria for an operating mode switch from partial displacement to full displacement of a variable displacement ICE. The present invention characterizes drivers and their perceived requirements for driveability.

Referring to FIG. 1, a graph of fuel economy gain is shown with three types of drivers characterized. In alternate embodiments of the present invention, any number of driver types may be characterized. A soft pedal or conservative driver is a driver that would be the most likely to monitor fuel economy for a variable displacement ICE. This type of driver is very likely to be dissatisfied if the claimed fuel economy benefits are not met. Operation in a partial displacement mode should be maximized for this type of driver.

A normal driver would utilize a normalized or nominal cycling schedule between partial and full displacement in a variable displacement ICE.

An aggressive driver is not likely to be in a partial displacement mode for any extended period of time due to high power demand and brake and accelerator pedal dynamics. The aggressive driver will realize less fuel economy gain than a conservative or normal driver and will be dissatisfied if the cylinder deactivation detracts from the desired driving experience. The aggressive driver would force numerous switching cycles if the control of the displacement of the variable displacement ICE used a nominal calibration.

Fuel economy for a variable displacement ICE should be maximized for soft pedal drivers and normal drivers, as their driving behaviors will allow superior fuel economy without any perceived decrease in performance. Aggressive drivers will not be as concerned with the fuel economy benefits of a variable displacement engine, as they favor performance. The present invention maximizes the amount of time spent in partial displacement mode for a soft pedal driver and a normal driver while maintaining the same performance and driveability of a fully-displaced ICE for an aggressive driver.

The engine control system of the present invention can characterize the type of driver using numerous sensor inputs such as an accelerator pedal position sensor, a brake pedal sensor, a manifold air pressure sensor, a throttle position sensor, and other traditional sensors used in the control of an ICE. By monitoring these sensor inputs over time, the engine control system will characterize the driver and then utilize calibrated switch points for each type of driver that will allow a soft-pedal driver or a normal driver to quickly enter the partial displacement mode, while preventing unacceptable frequent cycling between displacement modes for an aggressive driver. In alternate embodiments of the present invention, adaptive switching points may be used that continually change in response to driver behavior. A variable filter for sensor inputs having calibrated hysteresis pairs may also be used in the present invention to reduce cycling busyness.

DESCRIPTION OF THE PREFERRED EMBODIMENT

Figure 1:
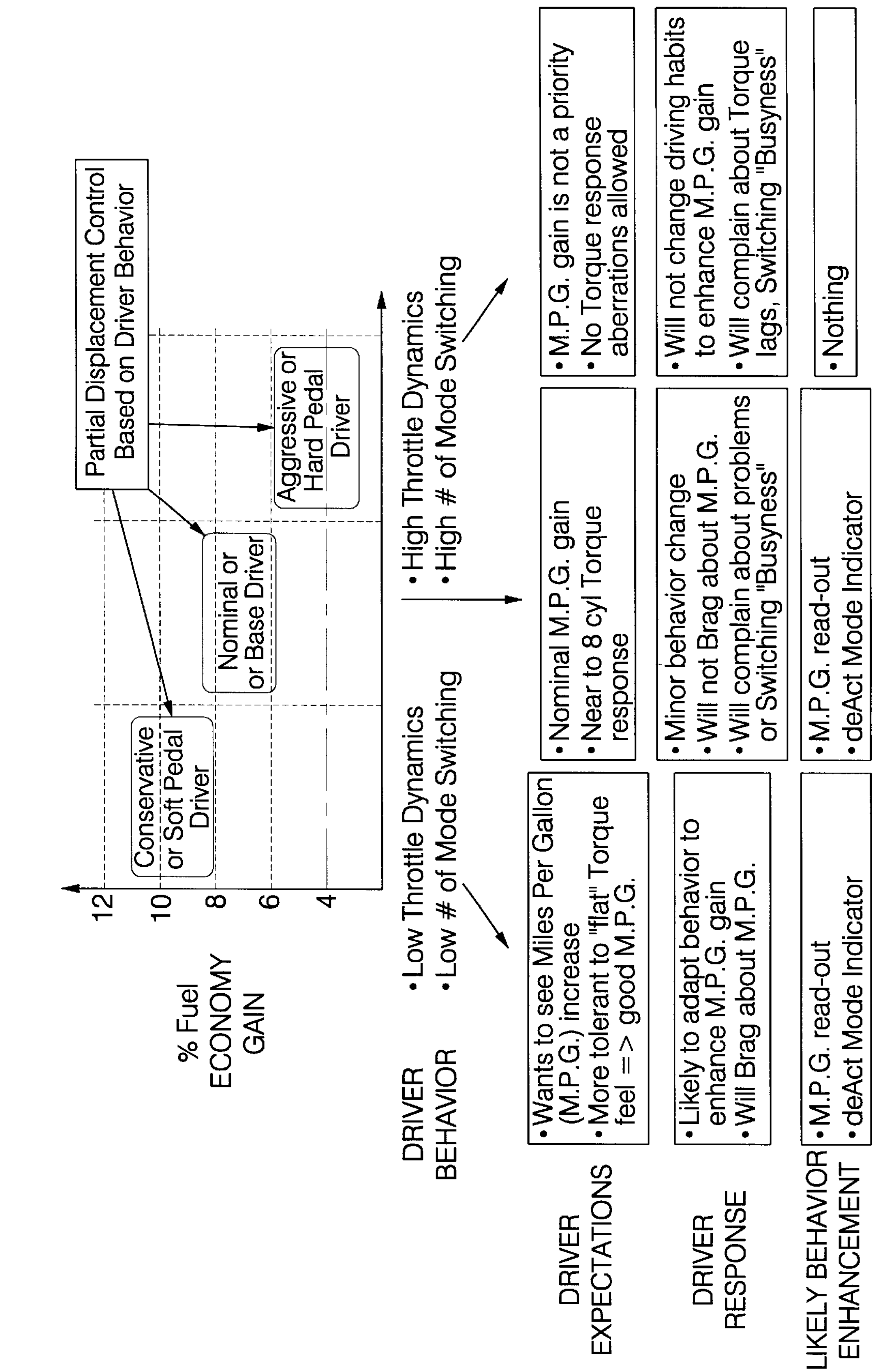
FIG. 1 is a graph of percent fuel economy gain shown with different driver characterizations.
Figure 2:
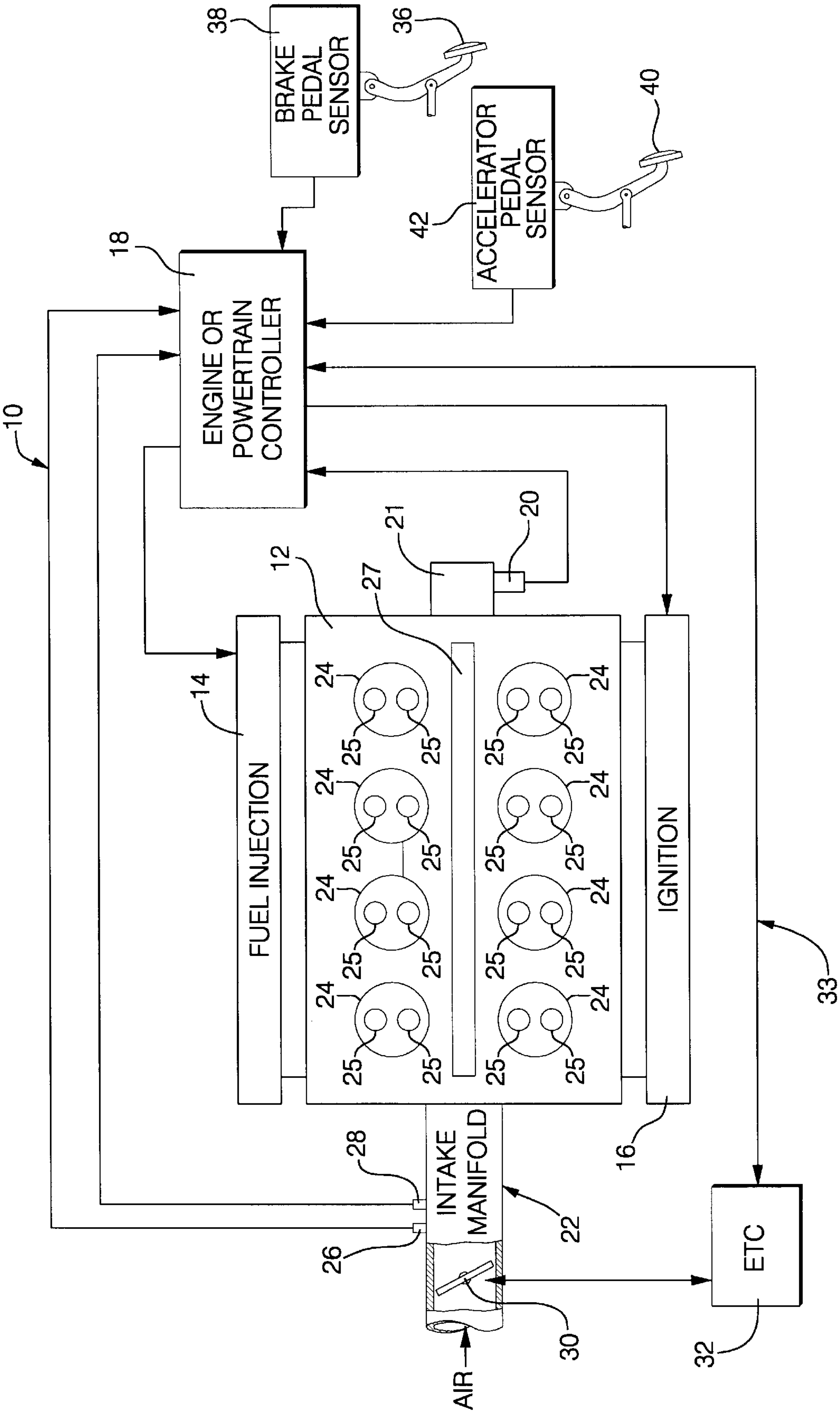
FIG. 2 is a diagrammatic drawing of the control system of the present invention.

FIG. 2 is a diagrammatic drawing of the vehicle control system 10 of the present invention. The control system 10 includes a variable displacement ICE 12 having fuel injectors 14 and spark plugs 16 (in the case of a gasoline engine) controlled by an engine or powertrain controller 18. The ICE 12 crankshaft 21 speed and position are detected by a speed and position detector 20 that generates a signal such as a pulse train to the engine or powertrain controller 18. The ICE 12 may comprise a gasoline ICE or any other ICE known in the art. An intake manifold 22 provides air to the cylinders 24 of the ICE 10, the cylinders having valves 25. The valves 25 are further coupled to an actuation apparatus 27 such as used in an overhead valve or overhead cam engine configuration that may be physically coupled and decoupled to the valves 25 to shut off air flow through the cylinders 24. An air flow sensor 26 and manifold air pressure (MAP) sensor 28 detect the air flow and air pressure within the intake manifold 22 and generate signals to the powertrain controller 18. The airflow sensor 26 is preferably a hot wire anemometer and the MAP sensor 28 is preferably a strain gauge.

An electronic throttle 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. In the preferred embodiment of the present invention, an absolute rotary encoder is coupled to the electronic throttle 30 to provide speed and position information to the electronic throttle controller 32. In alternate embodiments of the present invention, a potentiometer may be used to provide speed and position information for the electronic throttle 30. The electronic throttle controller 32 further includes communication circuitry such as a serial link or automotive communication network interface to communicate with the powertrain controller 18 over an automotive communications network 33. In alternate embodiments of the present invention, the electronic throttle controller 32 may be fully integrated into the powertrain controller 18 to eliminate the need for a physically separate electronic throttle controller.

A brake pedal 36 in the vehicle is equipped with a brake pedal sensor 38 to determine the braking frequency and amount of pressure generated by an operator of the vehicle on the brake pedal 36. The brake pedal sensor 38 generates a signal to the powertrain controller 18 to determine a braking condition for the vehicle. A braking condition will indicate a low torque/low demand condition for the variable displacement ICE 12. An accelerator pedal 40 in the vehicle is equipped with a pedal position sensor 42 to sense the position and rate of change of the accelerator pedal 40. The pedal position sensor 42 signal is also communicated to the powertrain controller 18. In the preferred embodiment of the present invention, the brake pedal sensor 38 is a strain gauge and the pedal position sensor 42 is an absolute rotary encoder.

Figure 4:
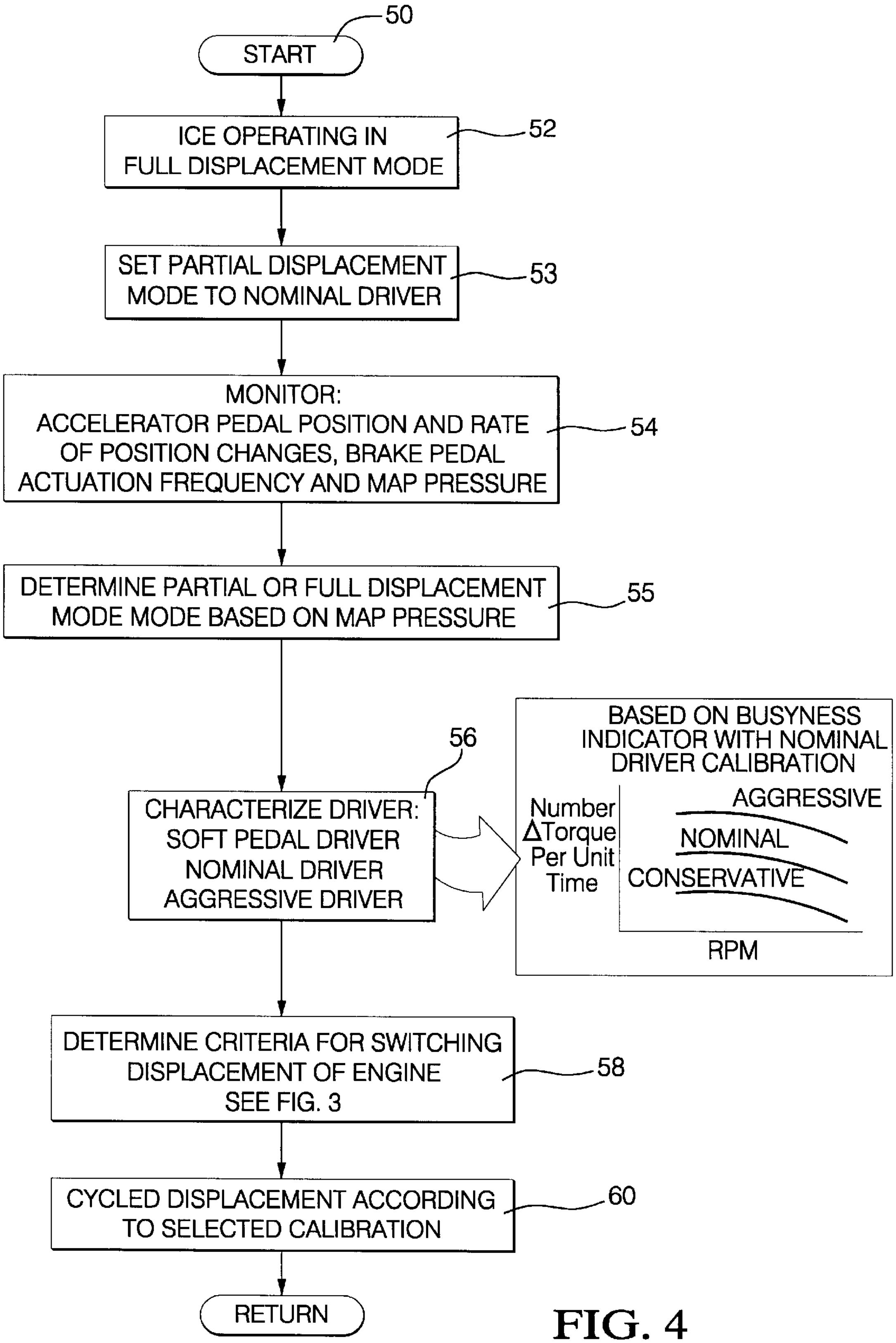
FIG. 4 is a flowchart of a method of the present invention.

The preferred method of the present invention is described in the flowchart of FIG. 4. The method starts at block 50 where an operator has started the vehicle and executed a transmission shift. At block 52, the ICE 12 is operating in the full displacement mode. At block 53, the partial displacement mode calibration or switch points is set at "normal" until the driver's behavior can be characterized. The operating mode switch points or calibration values are based on sensed MAP values in the preferred embodiment, but may comprise any other variable indicative of output torque in an ICE. At block 54, the controller 18 monitors the accelerator pedal position sensor 42, the brake pedal sensor 38 and the MAP sensor 28. At block 55, the operating mode of the ICE 12 is determined based on MAP pressure.

At block 56, the driver is characterized using sensor data as a soft pedal driver, a normal driver or an aggressive driver. The sensor data of particular interest is the number of specific torque changes or requests per unit time by the driver.

Figure 3:
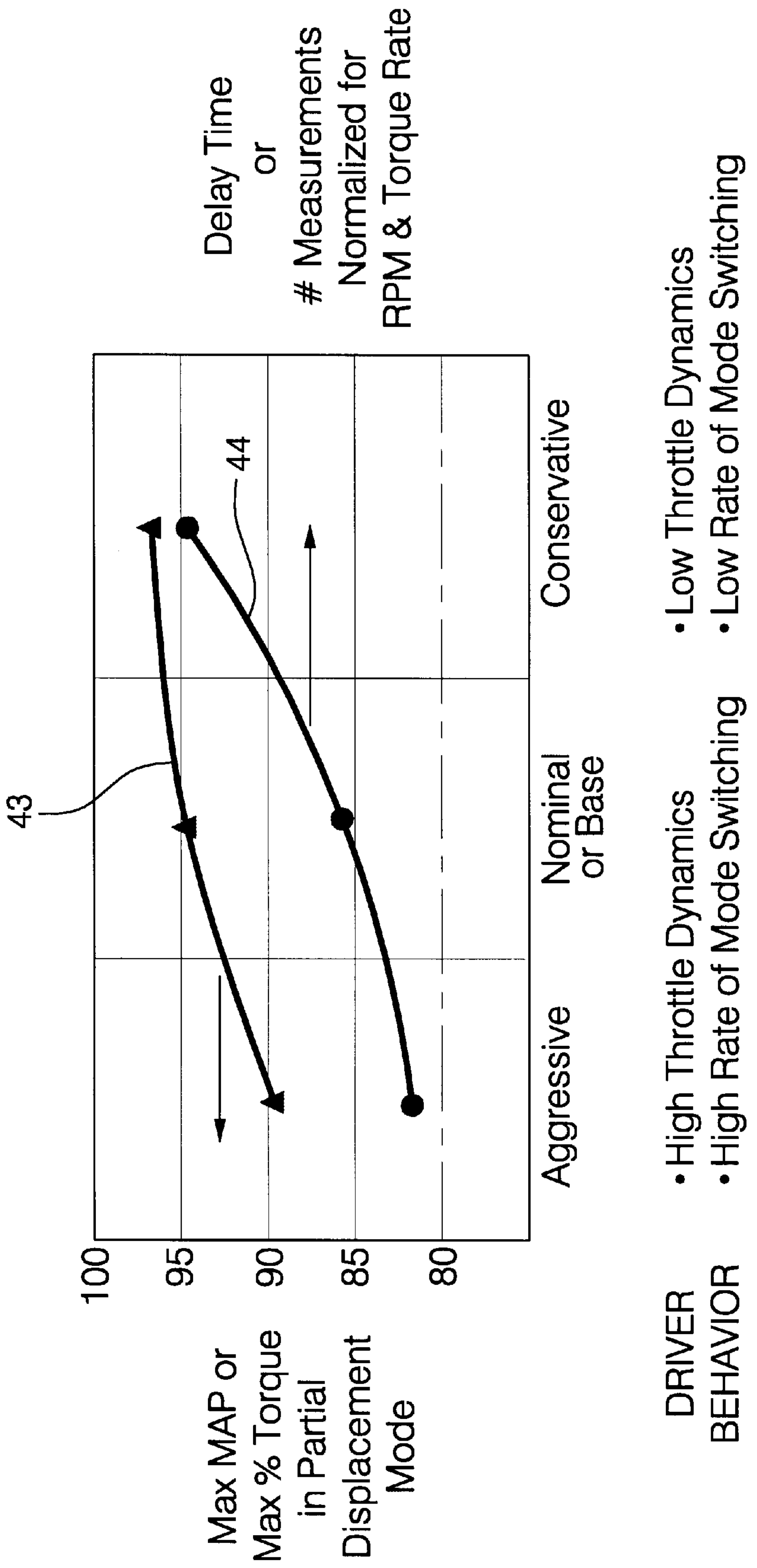
FIG. 3 is a graph of partial displacement switching criteria characterization.

At block 58, referring to FIG. 3, the switching points are determined for a particular driver characterization. FIG. 3 includes plots 43 and 44 that map the calibrated switch points for a driver characterization and MAP. Plot 43 illustrates that the nominal and conservative drivers will remain in the partial displacement mode to a much higher MAP level or percent of full load before switching to full displacement. Similarly, the number of measurements above the full displacement request in plot 43 or the time delay before switching to full displacement mode as shown in plot 44 increases for the nominal and conservative drivers. Plots 43 and 44 are determined experimentally to maximize partial displacement mode time without degrading the driveability expectations of different types of drivers. The switching calibrations are stored within the powertrain controller 18 memory and are selected to correspond to the driver characterization. In alternate embodiments, the calibration may be adaptive to correspond to the changing driving habits of a particular driver. At block 60, the ICE 12 cycles between partial displacement and full displacement according to the selected calibration.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system in a vehicle comprising:

a variable displacement internal combustion engine;

a controller for controlling the displacement of said variable displacement internal combustion engine;

an accelerator pedal position sensor electronically coupled to said controller; and wherein said controller receives pedal position information from said accelerator pedal position sensor and characterizes the type of driver operating the vehicle;

wherein said controller using said driver characterization determines when to operate said variable displacement internal combustion engine in a partially-displaced operating mode.

2. The engine control system of claim 1 wherein said variable displacement internal combustion engine is a gasoline engine.

3. The engine control system of claim 1 wherein said variable displacement internal combustion engine includes at least two cylinders.

4. The engine control system of claim 1 wherein said variable displacement internal combustion engine is an eight-cylinder engine.

5. The engine control system of claim 1 further comprising a brake pedal sensor electronically coupled to said controller.

6. The engine control system of claim 5 wherein said controller receives brake pedal operation information from said brake pedal sensor and further characterizes the type of driver operating the vehicle.

7. The engine control system of claim 1 wherein said controller includes a plurality of calibrations used to determine a manifold pressure switching point to determine when to operate said variable displacement internal combustion engine in a partially-displaced operating mode.

8. A method of controlling the displacement of a variable displacement internal combustion engine in a vehicle comprising the steps of:

determining manifold pressure in the variable displacement internal combustion engine;

determining accelerator pedal position in the vehicle;

characterizing driver behavior based on the changes in accelerator pedal position;

determining a calibration of said manifold pressure based on the characterization of said behavior; and varying the displacement of the variable displacement internal combustion engine with reference to said calibration.

9. The method of claim 8 further comprising the step of characterizing driver behavior based on the rate of change in said accelerator pedal position.

10. The method of claim 8 further comprising the step of characterizing driver behavior based on the frequency of change for a brake pedal.

11. The method of claim 8 further comprising the step of filtering the determined manifold pressure.

12. A method of controlling the displacement of a variable displacement internal combustion engine comprising the steps of:

measuring a variable indicative of torque for the variable displacement internal combustion engine;

generating a torque threshold that indicates a torque condition to vary the displacement of the variable displacement internal combustion engine; and characterizing driver behavior to determine said torque threshold.

13. The method of claim 12 wherein said variable is manifold pressure in said variable displacement internal combustion engine.

14. The method of claim 12 wherein said variable is a measured torque output of the variable displacement internal combustion engine.

15. A method of controlling the displacement of a variable displacement internal combustion engine comprising the steps of:

measuring a variable indicative of torque for a variable displacement internal combustion engine;

filtering said variable indicative of torque;

generating a torque threshold that indicates a torque condition to vary the displacement of the variable displacement internal combustion engine; and characterizing driver behavior to determine said torque threshold.

* * * * *